(12) United States Patent  
Hosokawa et al.

(10) Patent No.: US 12,554,343 B2  
(45) Date of Patent: Feb. 17, 2026

(54) INPUT DEVICE

(71) Applicant: Panasonic Intellectual Property Management Co., Ltd., Osaka (JP)

(72) Inventors: Yoshihiro Hosokawa, Fukui (JP); Naoki Matsumura, Fukui (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 304 days.

(21) Appl. No.: 17/573,436

(22) Filed: Jan. 11, 2022

(65) Prior Publication Data

US 2022/0234444 A1    Jul. 28, 2022

(30) Foreign Application Priority Data

Jan. 22, 2021   (JP) ................................. 2021-008931

(51) Int. Cl.
*B60K 35/10*    (2024.01)
*B60K 35/22*    (2024.01)
(Continued)

(52) U.S. Cl.
CPC ............ *G06F 3/0362* (2013.01); *B60K 35/10* (2024.01); *B60K 35/22* (2024.01); *B60K 35/28* (2024.01);
(Continued)

(58) Field of Classification Search
CPC .............. B60K 35/00; B60K 2360/126; B60K 2360/143; G06F 3/03547; G06F 3/0362; G06F 3/044
See application file for complete search history.

(56) References Cited

U.S. PATENT DOCUMENTS

2012/0261243 A1   10/2012   Yokoyama et al.
2013/0201126 A1*   8/2013   Mimura ................ G06F 3/0488
                                                             345/173
(Continued)

FOREIGN PATENT DOCUMENTS

JP    2012-221904 A    11/2012
JP    2015232844 A  *  12/2015

OTHER PUBLICATIONS

Japanese Notice of Reasons for Refusal dated Apr. 23, 2024, for the corresponding Japanese Patent Application No. 2021-008931, 7 pages. (With English Machine Translation).

*Primary Examiner* — David P. Merlino
*Assistant Examiner* — Mahmoud M Kazimi
(74) *Attorney, Agent, or Firm* — Seed Intellectual Property Law Group LLP

(57) ABSTRACT

An input device includes: an operating component that includes an operating surface and is operated by an operating body; a rotation detector that detects rotation of the operating component; a touch sensor that detects a contact position of the operating body on the operating surface; and a controller that outputs a detection result of the rotation detector when the rotation detector detects the rotation of the operating component, and outputs a detection result of the touch sensor when the touch sensor detects the contact position of the operating body. When the rotation detector detects the rotation of the operating component and the touch sensor detects the contact position of the operating body, the controller outputs the detection result of the rotation detector and does not output the detection result of the touch sensor for a first time period starting from the detection by the rotation detector.

8 Claims, 10 Drawing Sheets

(51) Int. Cl.
*B60K 35/25* (2024.01)
*B60K 35/28* (2024.01)
*G06F 3/0354* (2013.01)
*G06F 3/0362* (2013.01)
*G06F 3/044* (2006.01)

(52) U.S. Cl.
CPC .......... *G06F 3/03547* (2013.01); *G06F 3/044* (2013.01); *B60K 35/25* (2024.01); *B60K 2360/126* (2024.01); *B60K 2360/143* (2024.01)

(56) References Cited

U.S. PATENT DOCUMENTS

| | | | |
|---|---|---|---|
| 2015/0015521 A1* | 1/2015 | Okohira | B60K 35/10 345/173 |
| 2016/0231922 A1* | 8/2016 | Ueno | H04W 52/0254 |
| 2018/0307405 A1* | 10/2018 | Dandekar | G06F 3/04883 |
| 2020/0019252 A1* | 1/2020 | Okabe | G06F 3/0346 |
| 2022/0209772 A1* | 6/2022 | Shin | B60K 35/25 |
| 2025/0190103 A1* | 6/2025 | Yasutomo | G06F 3/04886 |

\* cited by examiner

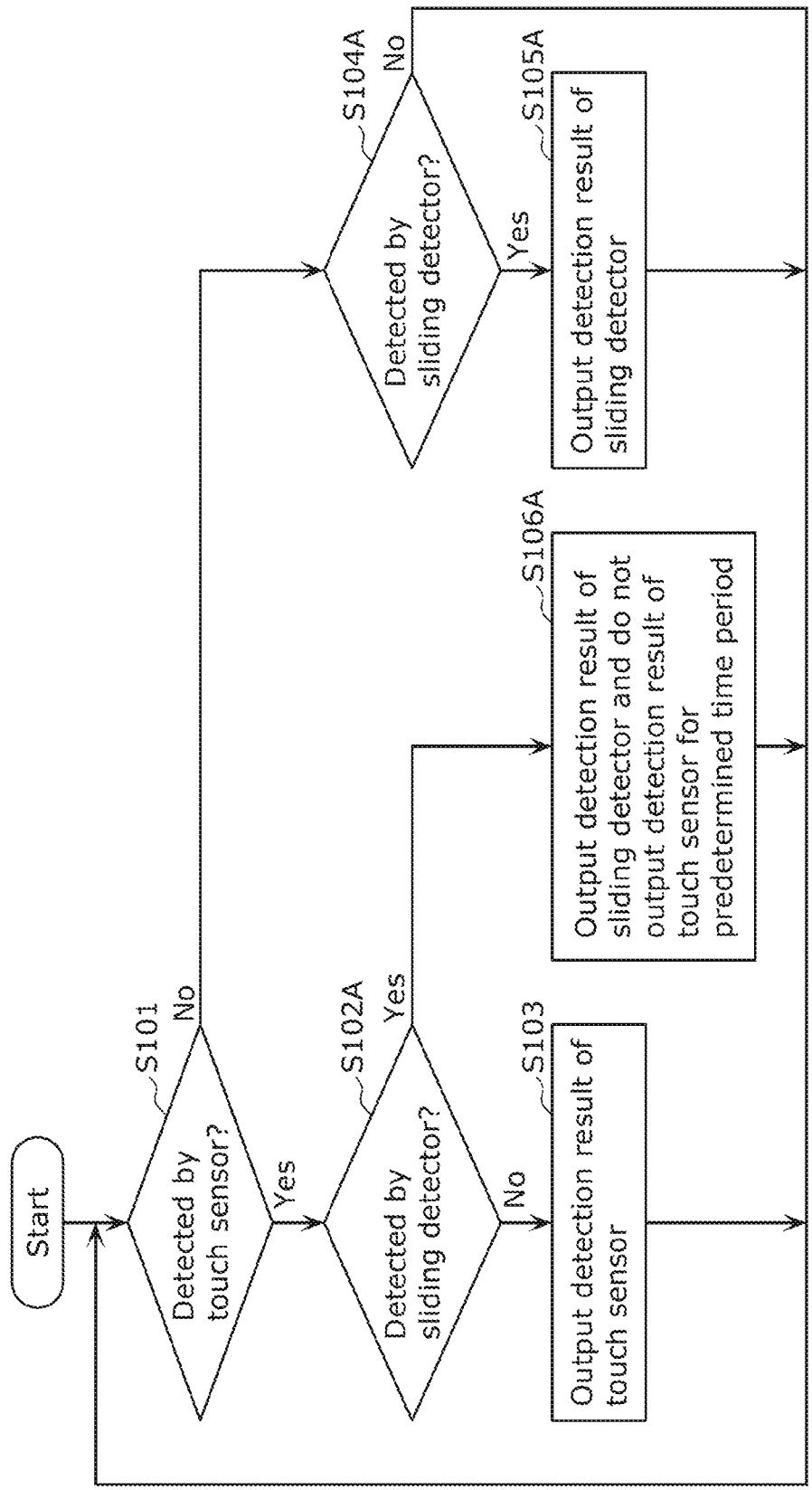

INPUT DEVICE

CROSS REFERENCE TO RELATED APPLICATION

The present application is based on and claims priority of Japanese Patent Application No. 2021-008931 filed on Jan. 22, 2021.

FIELD

The present disclosure relates to an input device operated by a user.

BACKGROUND

A vehicle input device which includes a display and an operating knob for making inputs to a graphical user interface (GUI) displayed on the display is known (see, for example, PTL 1).

The operating knob is disposed in a center console of a vehicle, and is rotated by an operating finger of a user. A rotation detecting sensor that detects rotation of the operating knob is arranged inside of the operating knob. Moreover, a capacitive touch sensor that detects contact of the operating finger of the user with a top surface of the operating knob is arranged on the back side of the top surface of the operating knob.

When the user performs a rotation operation of rotating the operating knob with his/her operating finger, a detection result from the rotation detecting sensor is output to the display. As a result, an input corresponding to the rotation operation is made to the GUI displayed on the display.

Moreover, when the user performs a touch operation of bringing his/her operating finger into contact with the top surface of the operating knob, a detection result from the touch sensor is output to the display. As a result, an input corresponding to the touch operation is made to the GUI displayed on the display.

PATENT LITERATURE

PTL 1: Japanese Unexamined Patent Application Publication No. 2012-221904

SUMMARY

However, the aforementioned conventional input device can be improved upon.

In view of this, the present disclosure provides an input device capable of improving upon the above related art.

An input device according to an aspect of the present disclosure includes: an operating component that includes an operating surface and is operated by being moved in a predetermined motion by an operating body; a motion detector that detects the predetermined motion of the operating component; a touch sensor that detects a contact position of the operating body on the operating surface; and a controller that outputs a detection result of the motion detector when the motion detector detects the predetermined motion of the operating component, and outputs a detection result of the touch sensor when the touch sensor detects the contact position of the operating body, wherein when the motion detector detects the predetermined motion of the operating component and the touch sensor detects the contact position of the operating body, the controller outputs the detection result of the motion detector and does not output the detection result of the touch sensor for a first time period starting from the detection by the motion detector.

It should be noted that these generic or specific aspects may be implemented using a system, a method, an integrated circuit, a computer program, or a computer-readable recording medium such as a compact disc read-only memory (CD-ROM), or may be implemented using any combination of a system, a method, an integrated circuit, a computer program, and a recording medium.

An input device according to an aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 14 is a flowchart illustrating the flow of operation of the input device according to Embodiment 2.

DESCRIPTION OF EMBODIMENTS

Figure 1:
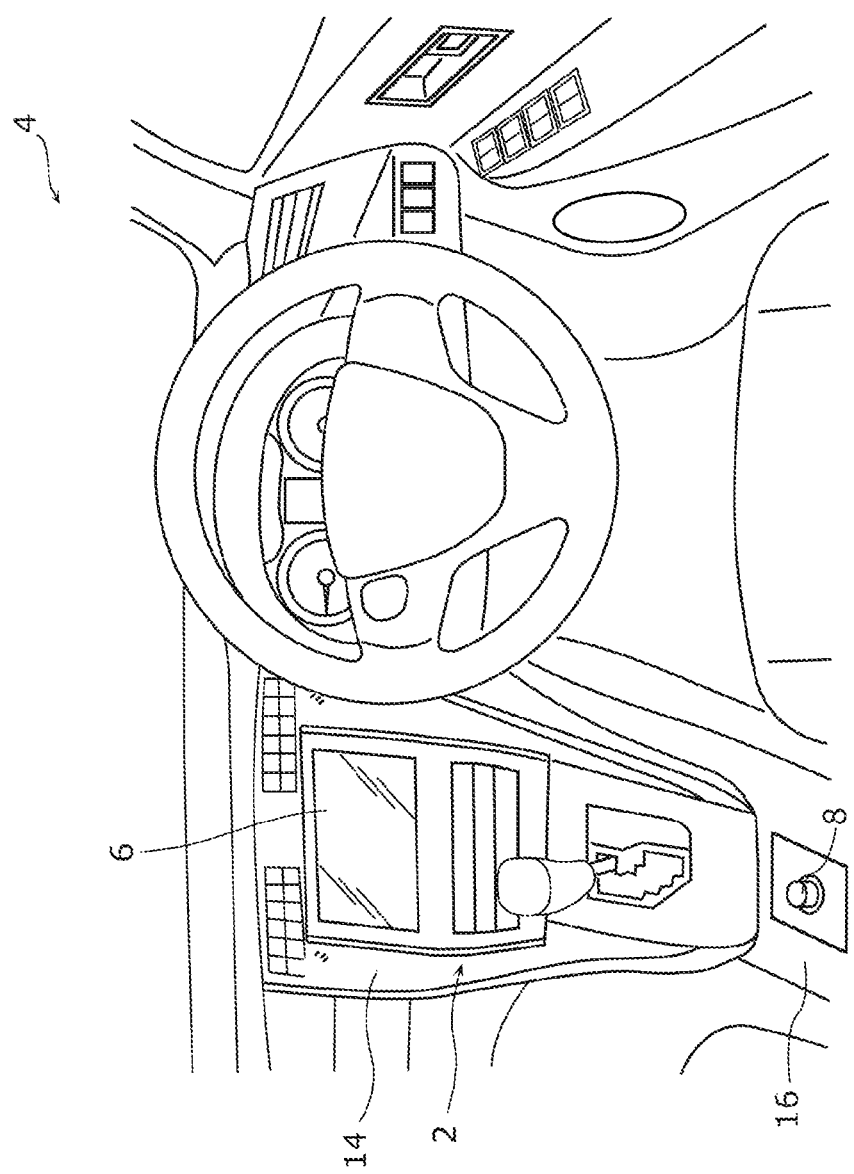
FIG. 1 is a diagram illustrating an example of the inside of a cabin of a vehicle equipped with an input device according to Embodiment 1.

The inventors found the following issues regarding the input device described in the "Background" section.

In the aforementioned conventional input device, when the user rotates the operating knob with his/her operating finger, the operating finger contacts with the top surface of the operating knob by mistake in some cases. In this case, an input corresponding to the touch operation is made to the GUI displayed on the display contrary to user's intention, leading to a problem that the operability deteriorates.

In order to resolve such issues, an input device according to an aspect of the present disclosure includes: an operating component that includes an operating surface and is operated by being moved in a predetermined motion by an operating body; a motion detector that detects the predetermined motion of the operating component; a touch sensor that detects a contact position of the operating body on the operating surface; and a controller that outputs a detection result of the motion detector when the motion detector detects the predetermined motion of the operating component, and outputs a detection result of the touch sensor when the touch sensor detects the contact position of the operating body, wherein when the motion detector detects the predetermined motion of the operating component and the touch sensor detects the contact position of the operating body, the controller outputs the detection result of the motion detector and does not output the detection result of the touch sensor for a first time period starting from the detection by the motion detector.

Generally, in the input device, when the operating component is operated by being moved in the predetermined motion by the operating body, the operating body contacts with the operating surface of the operating component by mistake in some cases. According to the present aspect, in such a case, the controller outputs the detection result of the motion detector and does not output the detection result of the touch sensor for a predetermined time period starting from the detection of the predetermined motion of the operating component by the motion detector. As a result, it is possible to avoid making an input via the touch sensor which is contrary to user's intention can be avoided, leading to enhancement in the operability of the input device.

For example, when the contact position of the operating body detected by the touch sensor is unchanged for the first time period, the controller need not output the detection result of the touch sensor for, additionally, a second time period starting from an end of the first time period.

According to the present aspect, when the contact position of the operating body detected by the touch sensor is unchanged for the first time period, it is estimated that the user will continuously operate the operating component in the predetermined motion even after the end of the first time period. Therefore, the controller does not output the detection result of the touch sensor for, additionally, the second time period starting from the end of the first time period, thereby making it possible to avoid making an input via the touch sensor which is contrary to user's intention, leading to further enhancement in the operability of the input device.

For example, when the contact position of the operating body is continuously detected by the touch sensor for the first time period, the controller need not output the detection result of the touch sensor for, additionally, a second time period starting from an end of the first time period.

According to the present aspect, when the contact position of the operating body is continuously detected by the touch sensor for the first time period, it is estimated that the user will continuously operate the operating component in the predetermined motion even after the end of the first time period. Therefore, the controller does not output the detection result of the touch sensor for, additionally, the second time period starting from the end of the first time period, thereby making it possible to avoid making an input via the touch sensor which is contrary to user's intention, leading to further enhancement in the operability of the input device.

For example, the predetermined motion may be rotation of the operating component, and when the motion detector detects that the operating component is rotated by a predetermined angle and the touch sensor detects the contact position of the operating body, the controller may output the detection result of the motion detector and need not output the detection result of the touch sensor for the first time period.

According to the present aspect, even in the case where the operating body contacts with the operating surface of the operating component by mistake when the operating component is rotated by the operating body, it is possible to avoid making an input via the touch sensor which is contrary to user's intention, leading to enhancement in the operability of the input device.

For example, the predetermined motion may be sliding of the operating component.

According to the present aspect, even in the case where the operating body contacts with the operating surface of the operating component by mistake when the operating component is made to slide by the operating body, it is possible to avoid making an input via the touch sensor which is contrary to user's intention, leading to enhancement in the operability of the input device.

For example, the input device may further include a display that displays an input made via the operating component and the touch sensor by the operating body. The controller may output the detection result of the motion detector and the detection result of the touch sensor to the display.

According to the present aspect, even in the case where the operating body contacts with the operating surface of the operating component by mistake when the operating component is operated by being moved in the predetermined motion by the operating body, it is possible to avoid displaying the input made via the touch sensor which is contrary to user's intention on the display, leading to enhancement in the operability of the input device.

For example, the operating component may be of a hollow columnar shape and rotatable about a central axis of the operating component, the operating surface may be circular in shape and provided on a top surface of the operating component, the motion detector may be a sensor that detects the rotation of the operating component, and the touch sensor may be a capacitive touch sensor disposed behind a back side of the operating surface.

According to the present aspect, even in the case where the operating body contacts with the operating surface of the operating component by mistake when the operating component is rotated by the operating body, it is possible to avoid making an input via the touch sensor which is contrary to user's intention, leading to enhancement in the operability of the input device.

For example, the operating component may be configured to give a click feeling each time the operating component is rotated by a predetermined angle, and the motion detector may detect the rotation of the operating component by the predetermined angle each time the operating component gives one click feeling.

According to the present aspect, operability of the operating component by the user can be enhanced.

For example, the operating component may be of a hollow columnar shape and is slidable in a cross direction with respect to a placement component on which the operating component is placed, the operating surface may be circular in shape and provided on a top surface of the operating component, the motion detector may be a sensor that detects the sliding of the operating component, and the touch sensor may be a capacitive touch sensor disposed behind a back side of the operating surface.

According to the present aspect, even in the case where the operating body contacts with the operating surface of the operating component by mistake when the operating component is made to slide by the operating body, it is possible to avoid making an input via the touch sensor which is contrary to user's intention, leading to enhancement in the operability of the input device.

It should be noted that these generic or specific aspects may be implemented using a system, a method, an integrated circuit, a computer program, or a computer-readable recording medium such as a CD-ROM, or may be implemented using any combination of a system, a method, an integrated circuit, a computer program, and a recording medium.

Hereinafter, embodiments will be specifically described with reference to the Drawings.

It should be noted that each of the exemplary embodiments described below shows a generic or specific example. The numerical values, shapes, structural components, the arrangement and connection of the structural components, steps, the processing order of the steps, etc., shown in the following exemplary embodiments are mere examples, and are not intended to limit the scope of the present disclosure. Furthermore, among the structural components in the following exemplary embodiments, components not recited in any one of the independent claims that indicate the broadest concepts are described as arbitrary structural components.

Embodiment 1

Figure 2:
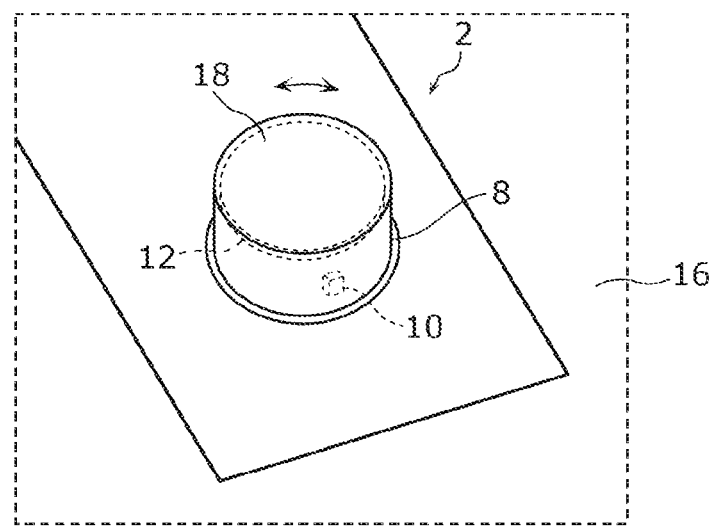
FIG. 2 is an enlarged view illustrating an operating component of the input device according to Embodiment 1.

First, the outline of input device 2 according to Embodiment 1 is described with reference to FIG. 1 and FIG. 2. FIG. 1 is a diagram illustrating an example of the inside of a cabin of vehicle 4 equipped with input device 2 according to Embodiment 1. FIG. 2 is an enlarged view illustrating operating component 8 of input device 2 according to Embodiment 1.

As illustrated in FIG. 1, input device 2 according to the present embodiment is provided inside of, for example, the cabin of vehicle 4 such as an automobile. Input device 2 is a device for operating various types of in-vehicle equipment such as car navigation equipment, audio equipment, or air conditioning equipment provided in vehicle 4, and is operated by a user who is a passenger of vehicle 4.

As illustrated in FIG. 1 and FIG. 2, input device 2 includes display 6, operating component 8, rotation detector 10 (an example of the motion detector), and touch sensor 12.

Display 6 is a display that displays a GUI for operating, for example, a map for car navigation or a menu screen or a search screen of the various types of in-vehicle equipment. Display 6 is arranged on instrument panel 14 of vehicle 4, and is configured by a liquid crystal display, an organic electro luminescence (EL) display, or the like.

Operating component 8 is a switch (so-called commander switch) for making inputs to the GUI displayed on display 6, and is operated by being moved in a predetermined motion (rotation, in the present embodiment). Operating component 8 is a hollow columnar rotary switch, and is arranged in center console 16 of vehicle 4. As illustrated in FIG. 2, operating component 8 can be rotated about the central axis of operating component 8 with respect to center console 16, by the operating finger (an example of the operating body) of the user. Circular operating surface 18 is formed on a top surface of operating component 8. Note that operating component 8 is configured so as to give a click feeling (tactile feedback) to the user each time operating component 8 is rotated by a predetermined angle (for example, 12 degrees).

Rotation detector 10 is a sensor that detects rotation of operating component 8, and is configured by, for example, a photo-interrupter. As illustrated in FIG. 2, rotation detector 10 is arranged inside of operating component 8. Rotation detector 10 detects the rotation of operating component 8 each time operating component 8 is rotated by the predetermined angle (for example, 12 degrees). That is, rotation detector 10 detects the rotation of operating component 8 each time operating component 8 gives one click feeling to the user.

Touch sensor 12 is a capacitive touch sensor that detects a contact position of the operating finger on operating surface 18 of operating component 8. As illustrated in FIG. 2, touch sensor 12 is disposed behind the back side of operating surface 18 of operating component 8. Touch sensor 12 detects an operation of bringing the operating finger into contact with operating surface 18 (hereinafter, referred to as the "touch operation").

Figure 3:
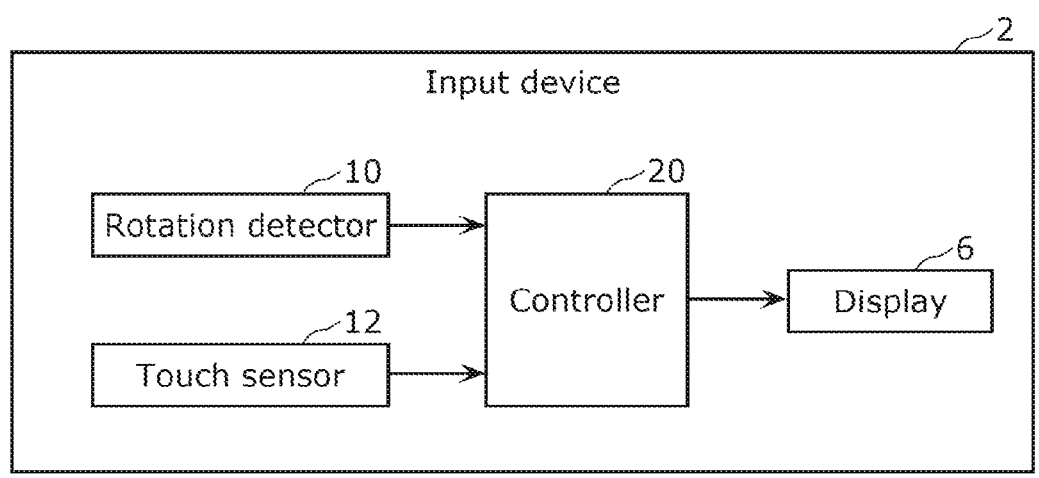
FIG. 3 is a block diagram illustrating a functional configuration of the input device according to Embodiment 1.

Next, the functional configuration of input device 2 according to Embodiment 1 is described with reference to FIG. 3. FIG. 3 is a block diagram illustrating the functional configuration of input device 2 according to Embodiment 1.

As illustrated in FIG. 3, input device 2 includes, as its functional configuration, display 6, rotation detector 10, touch sensor 12, and controller 20.

When rotation detector 10 detects the rotation of operating component 8, rotation detector 10 outputs a detection signal to controller 20.

When touch sensor 12 detects the contact position of the operating finger on operating surface 18 of operating component 8, touch sensor 12 outputs a detection signal to controller 20.

Controller 20 causes display 6 to display the GUI for operating the various types of in-vehicle equipment. Moreover, controller 20 changes the GUI displayed on display 6 on the basis of the respective detection signals from rotation detector 10 and touch sensor 12. That is, the inputs that are made via operating component 8 and touch sensor 12 by the operating finger are displayed on display 6.

Here, "making an input via operating component 8" means performing an operation of rotating operating component 8 by the operating finger, and "making an input via touch sensor 12" means performing an operation of bringing the operating finger into contact with operating surface 18 of operating component 8.

Note that controller 20 may be configured by, for example, a processor that executes a predetermined program and a memory that stores therein the predetermined program, and may be configured by, for example, a dedicated circuit. Alternatively, controller 20 may be configured by, for example, an electronic control unit (ECU) provided in vehicle 4.

When the user rotates operating component 8 with his/her operating finger, rotation detector 10 outputs the detection signal to controller 20. On the basis of the detection signal from rotation detector 10, controller 20 outputs, to display 6, rotation detection information (a detection result of rotation detector 10) that is information indicating the number of times of the rotation, the rotation direction, and the like of operating component 8. As a result, the GUI displayed on display 6 changes in accordance with the number of times of the rotation, the rotation direction, and the like of operating component 8.

Moreover, when the operating finger of the user contacts with operating surface 18 of operating component 8, touch sensor 12 outputs the detection signal to controller 20. On the basis of the detection signal from touch sensor 12, controller 20 outputs, to display 6, touch detection information (a detection result of touch sensor 12) that is information indicating: whether or not the operating finger contacts with operating surface 18; the contact position of the operating finger on operating surface 18; and the like. As a result, the GUI displayed on display 6 changes in accordance with the contact position of the operating finger on operating surface 18 and the like.

Figure 4:
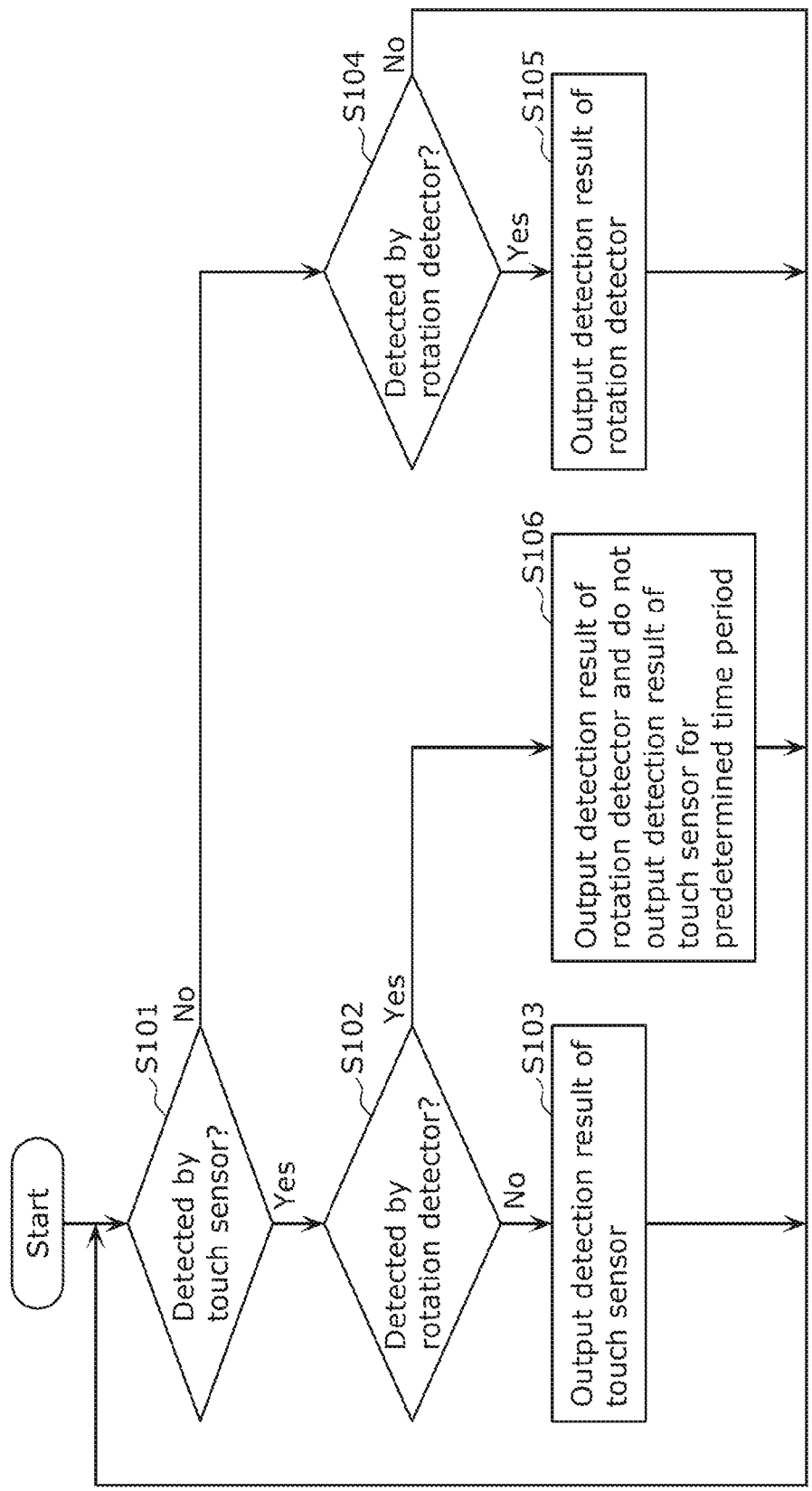
FIG. 4 is a flowchart illustrating the flow of operation of the input device according to Embodiment 1.
Figure 5:
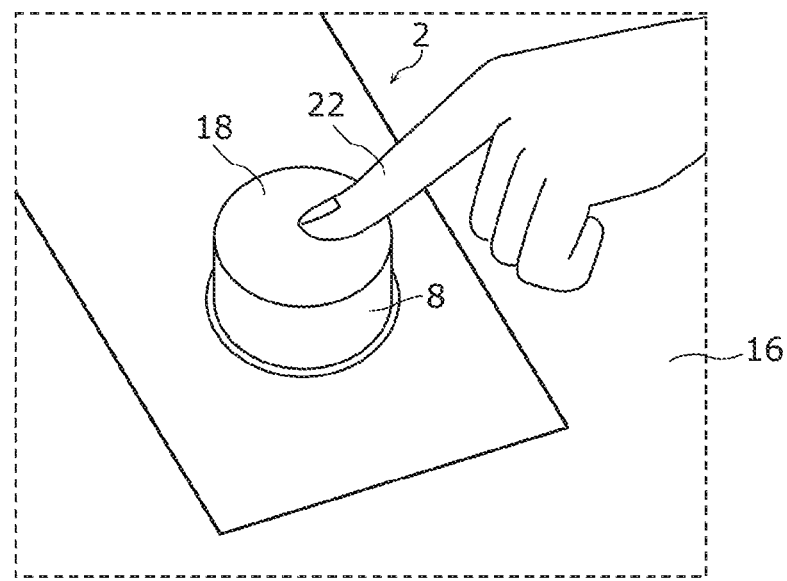
FIG. 5 is a diagram for describing the operation of the input device according to Embodiment 1.
Figure 6:
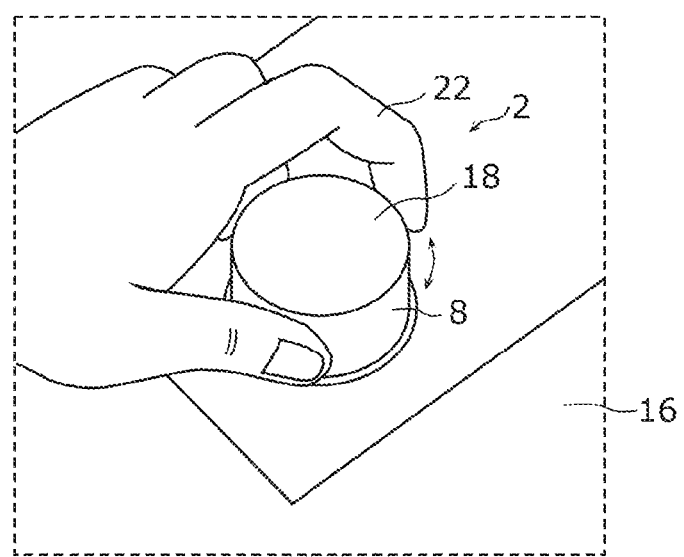
FIG. 6 is a diagram for describing the operation of the input device according to Embodiment 1.
Figure 7:
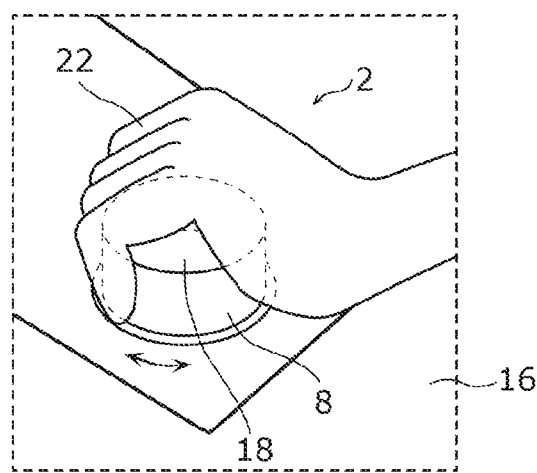
FIG. 7 is a diagram for describing the operation of the input device according to Embodiment 1.

Next, the operation of input device 2 according to Embodiment 1 is described with reference to FIG. 4 to FIG. 7. FIG. 4 is a flowchart illustrating the flow of the operation of input device 2 according to Embodiment 1. FIG. 5 to FIG. 7 are diagrams for describing the operation of input device 2 according to Embodiment 1.

First, as illustrated in FIG. 5, description is given of the case where the user performs, with operating finger 22, the touch operation on operating surface 18 of operating component 8. In this case, as illustrated in FIG. 4, touch sensor 12 detects the contact position of operating finger 22 on operating surface 18 of operating component 8 (YES in S101), and outputs the detection signal to controller 20. Moreover, rotation detector 10 does not detect the rotation of operating component 8 (NO in S102), and does not output the detection signal to controller 20. Controller 20 outputs the touch detection information to display 6 on the basis of the detection signal from touch sensor 12 (S103). After that, the procedure returns to Step S101.

Next, as illustrated in FIG. 6, description is given of the case where the user pinches the side surface of operating component 8 with operating finger 22 and rotates operating component 8 in the state where operating finger 22 is not in contact with operating surface 18 of operating component 8. In this case, as illustrated in FIG. 4, touch sensor 12 does not detect the contact position of operating finger 22 on operating surface 18 of operating component 8 (NO in S101), and does not output the detection signal to controller 20. Moreover, rotation detector 10 detects the rotation of operating component 8 (YES in S104), and outputs the detection signal to controller 20. Controller 20 outputs the rotation detection information to display 6 on the basis of the detection signal from rotation detector 10 (S105). After that, the procedure returns to Step S101.

Next, as illustrated in FIG. 7, description is given of the case where the user pinches the side surface of operating component 8 with operating finger 22 and rotates operating component 8 in the state where operating finger 22 is in contact with operating surface 18 of operating component 8. It is assumed here that operating finger 22 is in contact with operating surface 18 of operating component 8 contrary to user's intention.

In this case, as illustrated in FIG. 4, touch sensor 12 detects the contact position of operating finger 22 on operating surface 18 of operating component 8 (YES in S101), and outputs the detection signal to controller 20. Moreover, rotation detector 10 detects the rotation of operating component 8 (YES in S102), and outputs the detection signal to controller 20.

In the case where controller 20 simultaneously receives the respective detection signals from rotation detector 10 and touch sensor 12, controller 20 outputs the rotation detection information to display 6 and does not output the touch detection information to display 6 for a predetermined time period (for example, 100 msec to 200 msec) (an example of the first time period) starting from the detection of the rotation of operating component 8 by rotation detector 10 (S106). After the end of the predetermined time period starting from the detection of the rotation of operating component 8 by rotation detector 10, the procedure returns to Step S101.

Note that, in the case where the user does not perform any operation on input device 2, touch sensor 12 does not detect the contact position of operating finger 22 on operating surface 18 of operating component 8 (NO in S101), and rotation detector 10 does not detect the rotation of operating component 8 (NO in S104). After that, the procedure returns to Step S101.

Generally, in input device 2, when the user rotates operating component 8 with operating finger 22, operating finger 22 contacts with operating surface 18 of operating component 8 by mistake in some cases. According to the present embodiment, in such a case, controller 20 outputs the rotation detection information to display 6 and does not output the touch detection information to display 6 for the predetermined time period starting from the detection of the rotation of operating component 8 by rotation detector 10. As a result, it is possible to avoid making an input to the GUI displayed on display 6 via touch sensor 12 which is contrary to user's intention, leading to enhancement in the operability of input device 2.

Figure 8:
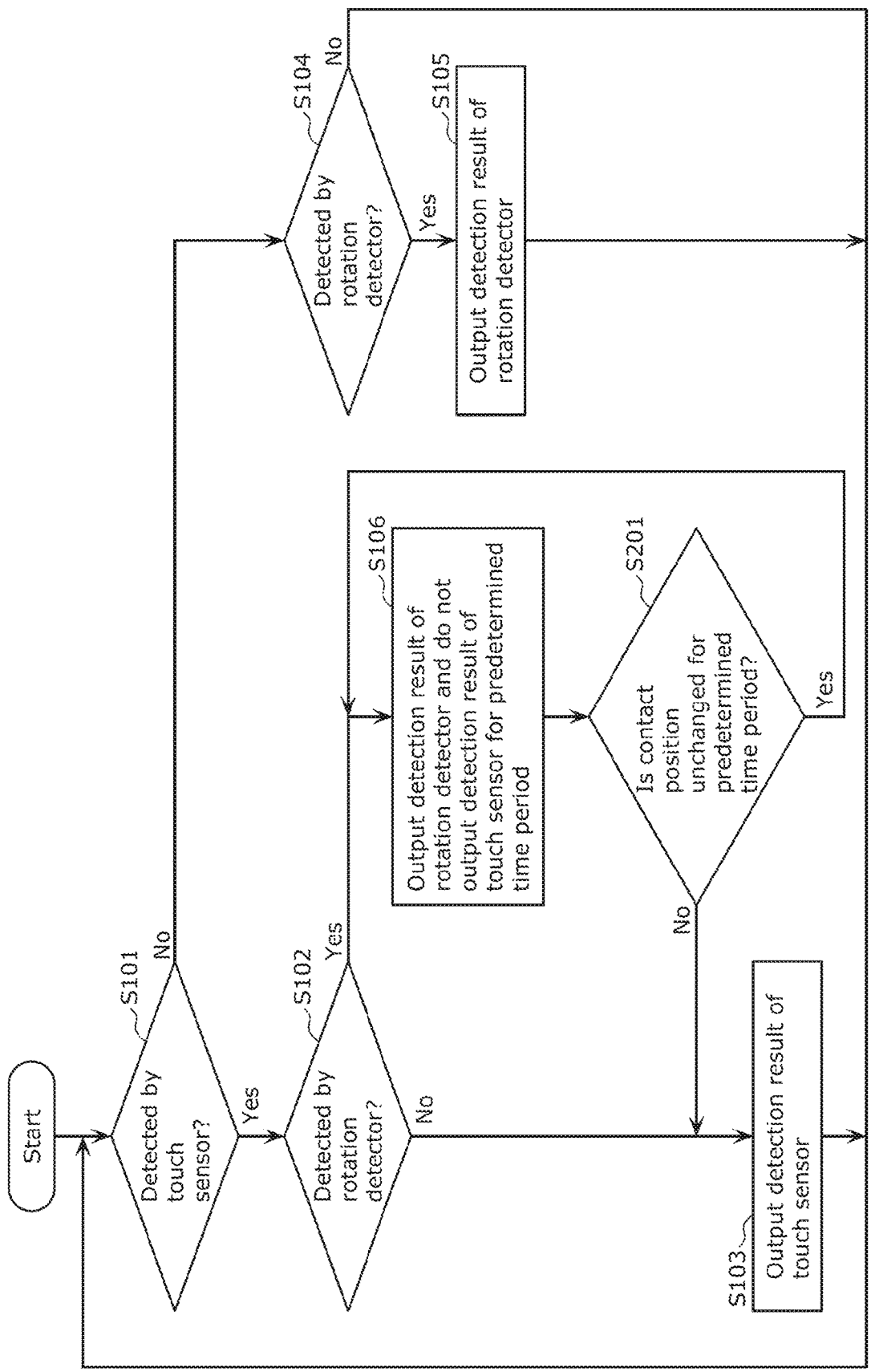
FIG. 8 is a flowchart illustrating the flow of operation of the input device according to Variation 1 of Embodiment 1.
Figure 9:
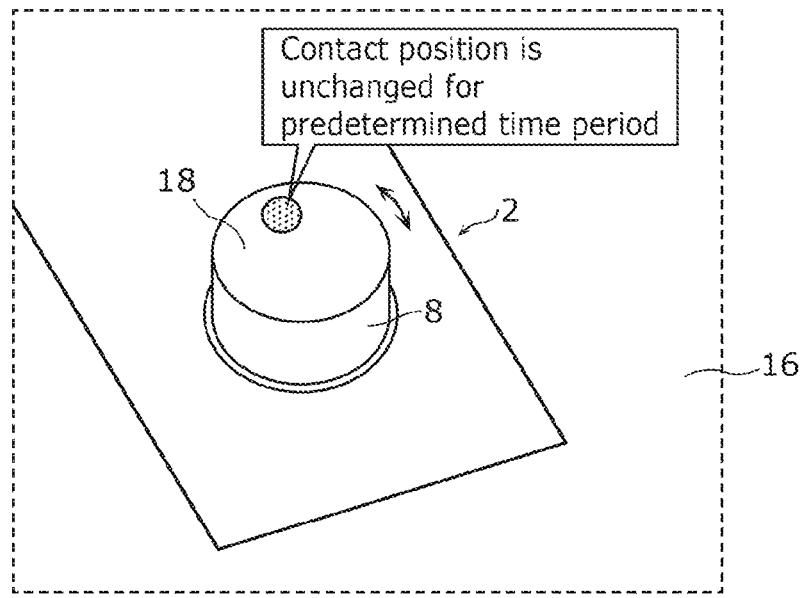
FIG. 9 is a diagram for describing the operation of the input device according to Variation 1 of Embodiment 1.
Figure 10:
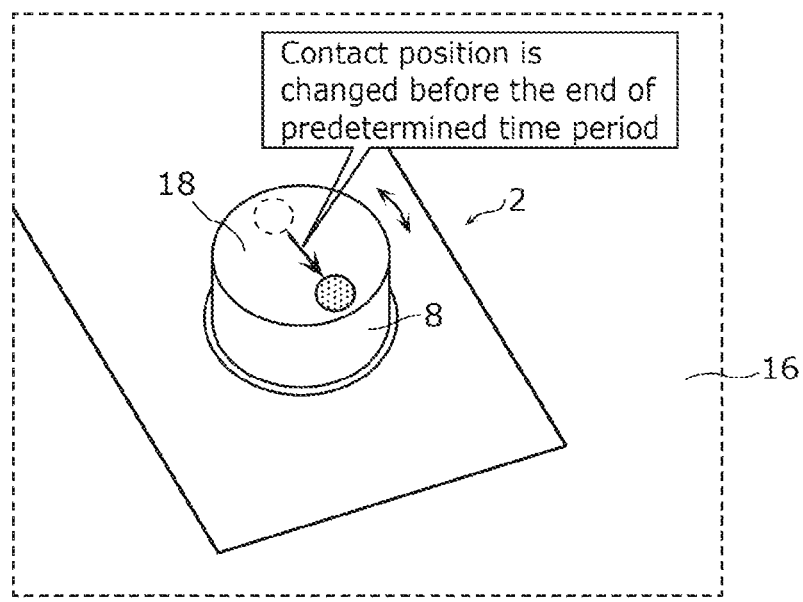
FIG. 10 is a diagram for describing the operation of the input device according to Variation 1 of Embodiment 1.

The operation of input device 2 according to Variation 1 of Embodiment 1 is described with reference to FIG. 8 to FIG. 10. FIG. 8 is a flowchart illustrating the flow of the operation of input device 2 according to Variation 1 of Embodiment 1. FIG. 9 and FIG. 10 are diagrams for describing the operation of input device 2 according to Variation 1 of Embodiment 1. Note that, in the flowchart of FIG. 8, the same processing as that in the flowchart of FIG. 4 is denoted by the same step number, and description thereof is omitted.

As illustrated in FIG. 8, in the present variation, after Step S106, controller 20 determines whether or not the contact position of operating finger 22 detected by touch sensor 12 is unchanged for the predetermined time period (an example of the first time period) starting from the detection by rotation detector 10, on the basis of the detection signal from touch sensor 12 (S201).

As illustrated in FIG. 9, in the case where the contact position (which is indicated by a black circle in FIG. 9) of operating finger 22 detected by touch sensor 12 is unchanged for the predetermined time period starting from the detection by rotation detector 10 (YES in S201), controller 20 estimates that the user will continuously rotate operating component 8 even after the end of the predetermined time period, and the procedure goes to Step S106. Subsequently, controller 20 outputs the rotation detection information to display 6 and does not output the touch detection information to display 6 for a predetermined time period (an example of the second time period) starting from the end of the aforementioned predetermined time period (S106). Note that the first time period and the second time period may be the same and may be different.

The procedure returns to Step S201. As illustrated in FIG. 10, in the case where the contact position (which is indicated by a black circle in FIG. 10) of operating finger 22 detected by touch sensor 12 is changed before the end of the predetermined time period starting from the detection by rotation detector 10 (NO in S201), controller 20 estimates that the user will perform the touch operation after the end of the predetermined time period, and the procedure goes to Step S103. Subsequently, controller 20 stops the output of the rotation detection information, and outputs the touch detection information to display 6 on the basis of the detection signal from touch sensor 12 (S103).

Figure 11:
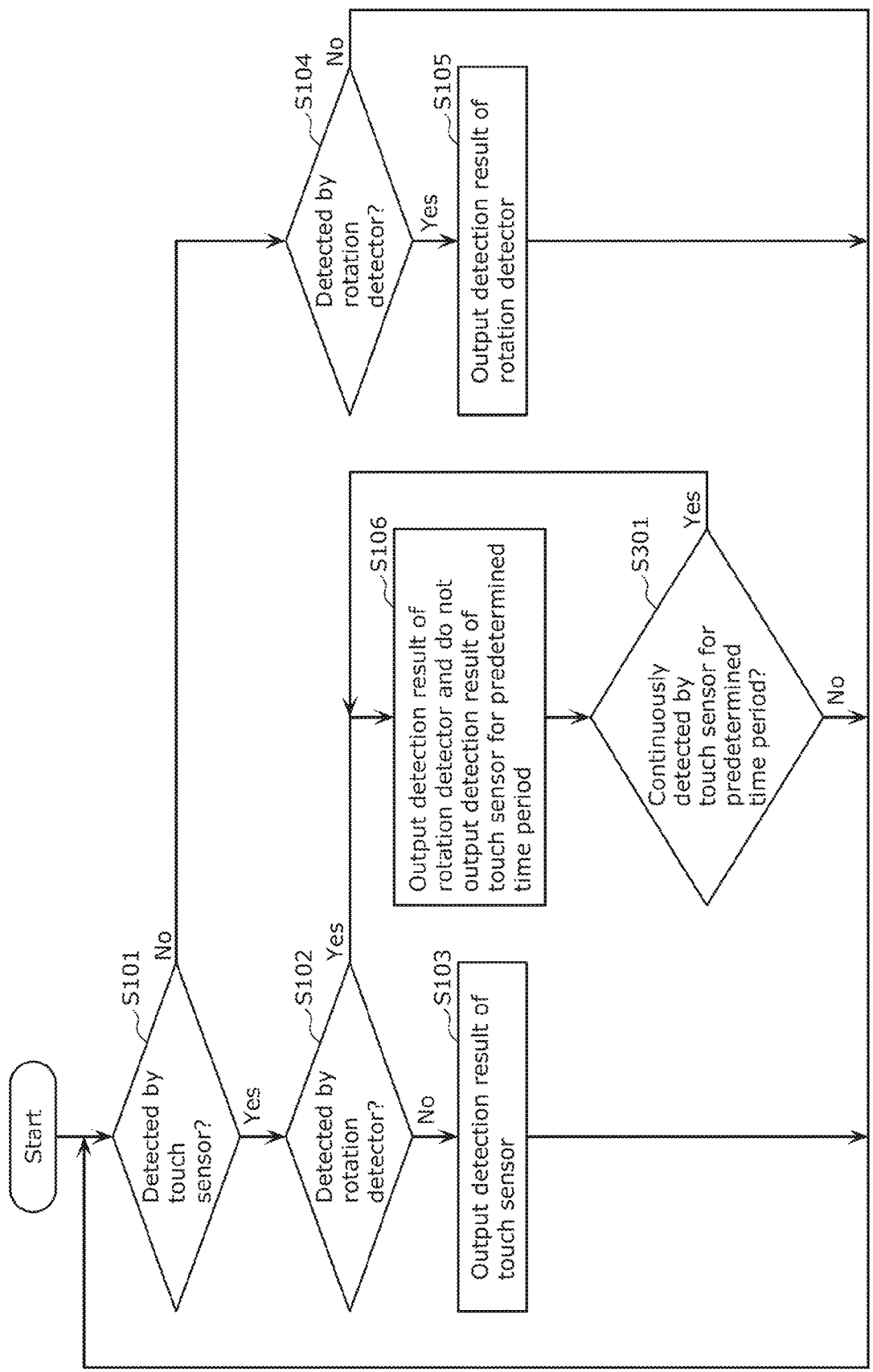
FIG. 11 is a flowchart illustrating the flow of the operation of the input device according to Variation 2 of Embodiment 1.

The operation of input device 2 according to Variation 2 of Embodiment 1 is described with reference to FIG. 11. FIG. 11 is a flowchart illustrating a procedure of the operation of input device 2 according to Variation 2 of Embodiment 1. Note that, in the flowchart of FIG. 11, the same processing as that in the flowchart of FIG. 4 is denoted by the same step number, and description thereof is omitted.

As illustrated in FIG. 11, in the present variation, after Step S106, controller 20 determines whether or not the contact position of operating finger 22 is continuously detected by touch sensor 12 for the predetermined time period (an example of the first time period) starting from the detection by rotation detector 10 (S301).

In the case where the contact position of operating finger 22 is continuously detected by touch sensor 12 for the predetermined time period starting from the detection by rotation detector 10 (YES in S301), controller 20 estimates that the user will continuously rotate operating component 8 even after the end of the predetermined time period, and the procedure goes to Step S106. Subsequently, controller 20 outputs the rotation detection information to display 6 and does not output the touch detection information to display 6 for the predetermined time period (an example of the second time period) starting from the end of the aforementioned predetermined time period (S106). Note that the first time period and the second time period may be the same and may be different.

The procedure returns to Step S301. In the case where the contact position of operating finger 22 is continuously undetected by touch sensor 12 for the predetermined time period starting from the detection by rotation detector 10 (NO in S301), controller 20 estimates that the user has moved operating finger 22 away from operating surface 18 of operating component 8, and the procedure returns to Step S101.

Embodiment 2

Figure 12:
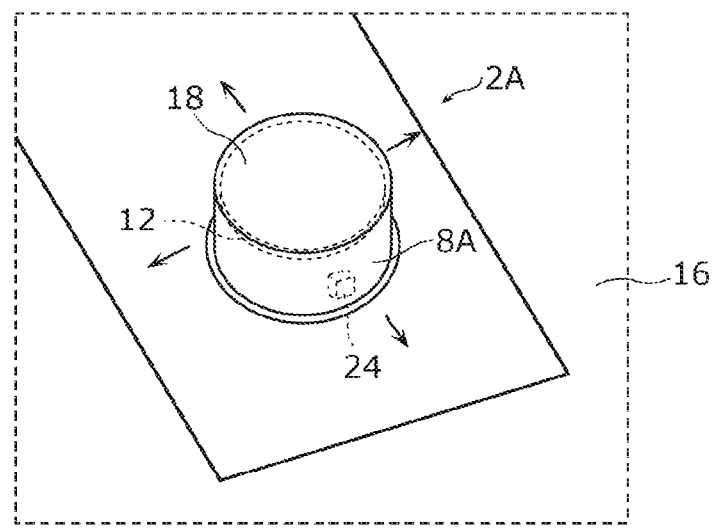
FIG. 12 is an enlarged view illustrating an operating component of an input device according to Embodiment 2.

The outline of input device 2A according to Embodiment 2 is described with reference to FIG. 12. FIG. 12 is an enlarged view illustrating operating component 8A of input device 2A according to Embodiment 2. Note that, in the present embodiment, same structural components as those in Embodiment 1 are denoted by the same reference signs, and their description is omitted.

As illustrated in FIG. 12, operating component 8A is a switch to be operated in a predetermined motion (in the present embodiment, sliding). Operating component 8A is a hollow columnar sliding switch, and is slidable by the operating finger of the user in, for example, a cross direction (a front-back direction and a left-right direction) with respect to center console 16.

Moreover, instead of rotation detector 10 described above in Embodiment 1, sliding detector 24 (an example of the motion detector) is arranged inside of operating component 8A. Sliding detector 24 is a sensor that detects sliding of operating component 8A, and is configured by, for example, a photo-interrupter or a tactile switch.

Figure 13:
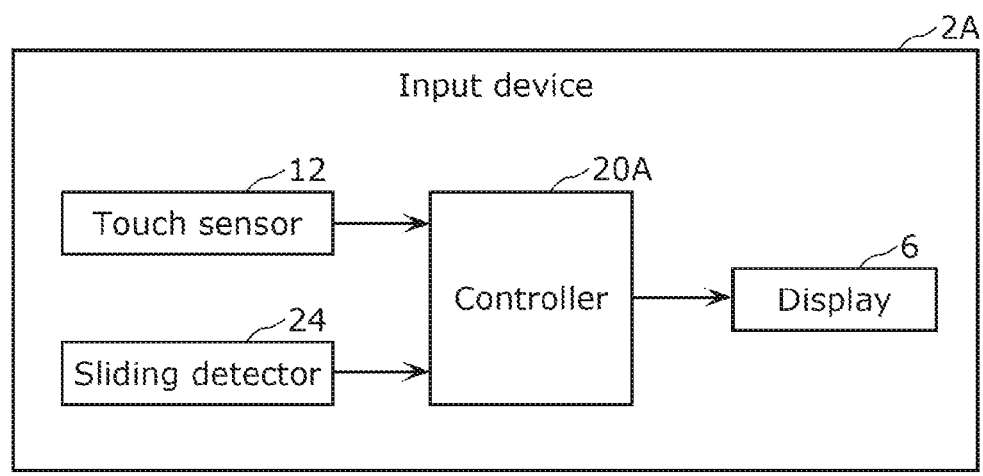
FIG. 13 is a block diagram illustrating a functional configuration of the input device according to Embodiment 2.

Next, the functional configuration of input device 2A according to Embodiment 2 is described with reference to FIG. 13. FIG. 13 is a block diagram illustrating the functional configuration of input device 2A according to Embodiment 2.

As illustrated in FIG. 13, input device 2A includes, as its functional configuration, display 6, touch sensor 12, sliding detector 24, and controller 20A.

When sliding detector 24 detects the sliding of operating component 8A, sliding detector 24 outputs a detection signal to controller 20A.

Controller 20A changes the GUI displayed on display 6 on the basis of the respective detection signals from touch sensor 12 and sliding detector 24.

When the user slides operating component 8A with his/her operating finger, sliding detector 24 outputs the detection signal to controller 20A. On the basis of the detection signal from sliding detector 24, controller 20A outputs, to display 6, sliding detection information (a detection result of sliding detector 24) that is information indicating the sliding direction and the like of operating component 8A. As a result, the GUI displayed on display 6 changes in accordance with the sliding direction and the like of operating component 8A.

Next, the operation of input device 2A according to Embodiment 2 is described with reference to FIG. 14. FIG. 14 is a flowchart illustrating the flow of the operation of input device 2A according to Embodiment 2. Note that, in the flowchart of FIG. 14, the same processing as that in the flowchart of FIG. 4 is denoted by the same step number.

First, description is given of the case where the user performs, with his/her operating finger, the touch operation on operating surface 18 of operating component 8A. In this case, touch sensor 12 detects the contact position of the operating finger on operating surface 18 of operating component 8A (YES in S101), and outputs the detection signal to controller 20A. Moreover, sliding detector 24 does not detect the sliding of operating component 8A (NO in S102A), and does not output the detection signal to controller 20A. Controller 20A outputs the touch detection information to display 6 on the basis of the detection signal from touch sensor 12 (S103). After that, the procedure returns to Step S101.

Next, description is given of the case where the user pinches the side surface of operating component 8A with his/her operating finger and slides operating component 8A in the state where the operating finger is not in contact with operating surface 18 of operating component 8A. In this case, touch sensor 12 does not detect the contact position of the operating finger on operating surface 18 of operating component 8A (NO in S101), and does not output the detection signal to controller 20A. Moreover, sliding detector 24 detects the sliding of operating component 8A (YES in S104A), and outputs the detection signal to controller 20A. Controller 20A outputs the sliding detection information to display 6 on the basis of the detection signal from sliding detector 24 (S105A). After that, the procedure returns to Step S101.

Next, description is given of the case where the user pinches the side surface of operating component 8A with his/her operating finger and slides operating component 8A in the state where the operating finger is in contact with operating surface 18 of operating component 8A. It is assumed here that the operating finger is in contact with operating surface 18 of operating component 8A contrary to user's intention.

In this case, touch sensor 12 detects the contact position of the operating finger on operating surface 18 of operating component 8A (YES in S101), and outputs the detection signal to controller 20A. Moreover, sliding detector 24 detects the sliding of operating component 8A (YES in S102A), and outputs the detection signal to controller 20A.

In the case where controller 20A simultaneously receives the respective detection signals from sliding detector 24 and touch sensor 12, controller 20A outputs the sliding detection information to display 6 and does not output the touch detection information to display 6 for the predetermined time period (for example, 100 msec to 200 msec) (an example of the first time period) starting from the detection of the sliding of operating component 8A by sliding detector 24 (S106A). After the end of the predetermined time period starting from the detection of the sliding of operating component 8A by sliding detector 24, the procedure returns to Step S101.

Note that, in the case where the user does not perform any operation on input device 2A, touch sensor 12 does not detect the contact position of the operating finger on operating surface 18 of operating component 8A (NO in S101), and sliding detector 24 does not detect the sliding of operating component 8A (NO in S104A). After that, the procedure returns to Step S101.

The present embodiment can provide effects similar to those of Embodiment 1. Note that, although operating component 8A is configured to be slidable in the present embodiment, operating component 8A may be configured to be both slidable and rotatable. In this case, input device 2A includes, as its functional configuration, rotation detector 10 described above in Embodiment 1 in addition to the structural components in Embodiment 2.

Other Variations

Although an input device according to one or more aspects has been described based on the respective exemplary embodiments described above, the present disclosure is not limited to the above embodiments. Forms obtained by making various modifications to the above embodiments that can be conceived by those skilled in the art, as well as forms obtained by combining structural components in different embodiment, without materially departing from the essence of the present disclosure, may thus be included in the scope of the one or more aspects.

Although operating finger 22 of the user is brought into contact with operating surface 18 of operating component 8 (8A) in each of the above embodiments, the present disclosure is not limited thereto, and, for example, a stylus pen as the operating body may be brought into contact with operating surface 18.

Moreover, although controller 20 (20A) outputs the respective detection results of rotation detector 10 (sliding detector 24) and touch sensor 12 to display 6 in each of the above embodiments, the present disclosure is not limited thereto, and controller 20 (20A) may output these detection results to, for example, an ECU for controlling display 6.

It should be noted that, in each of the above embodiments, the respective structural components may be implemented as dedicated hardware or may be realized by executing a software program suited to such structural components. Alternatively, the respective structural components may be implemented by a program executor such as a CPU or a processor reading out and executing the software program recorded in a recording medium such as a hard disk or a semiconductor memory.

Furthermore, part or all of the functions of the input device according to each of the above embodiments may be realized by a processor such as a CPU executing a program.

Some or all of the structural components included in each of the devices described above may be implemented as an IC card or a standalone module that can be inserted into and removed from the corresponding device. The IC card or the module is a computer system configured with a microprocessor, a ROM, a RAM, etc., for example. The IC card or the module may include a super multifunctional LSI. The microprocessor operates according to the computer program, so that a function of the IC card or the module is achieved. The IC card or the module may be tamper-resistant.

The present disclosure may be the methods described above. Furthermore, the present disclosure may be a computer program for causing a computer to execute the methods. Moreover, the present disclosure may be a digital signal of the computer program. Furthermore, the present disclosure may be the aforementioned computer program or digital signal recorded on a computer-readable recording medium, such as a flexible disk, a hard disk, a CD-ROM, an MO, a DVD, a DVD-ROM, a DVD-RAM, a Blu-ray (registered trademark) disc (BD), or a semiconductor memory. The present disclosure may also be the digital signal recorded on these recording media. Furthermore, the present disclosure may be the aforementioned computer program or digital signal transmitted via a telecommunication line, a wireless or wired communication line, a network represented by the Internet, and data broadcasting. Moreover, the present disclosure may be a computer system including a microprocessor and a memory. The memory may store the aforementioned computer program and the microprocessor may operate according to the computer program. Furthermore, by transferring the recording medium having the aforementioned program or digital signal recorded thereon or by transferring the aforementioned program or digital signal via the aforementioned network or the like, the present disclosure may be implemented by a different independent computer system.

While various embodiments have been described herein above, it is to be appreciated that various changes in form and detail may be made without departing from the spirit and scope of the present disclosure as presently or hereafter claimed.

The disclosure of the following patent application including specification, drawings, and claims is incorporated herein by reference in its entirety: Japanese Patent Application No. 2021-008931 filed on Jan. 22, 2021.

The present disclosure is applicable as, for example, an input device which includes a commander switch and is to be provided in a vehicle.

The invention claimed is:

1. An input device comprising:
an operating component that includes an operating surface and is operated by being moved in a predetermined motion by an operating body;
a motion detector that detects the predetermined motion of the operating component;
a touch sensor that detects a contact position of the operating body on the operating surface; and
a controller that outputs a detection result of the motion detector when the motion detector detects the predetermined motion of the operating component, and outputs a detection result of the touch sensor when the touch sensor detects the contact position of the operating body, wherein
when the touch sensor detects the contact position of the operating body during detecting the predetermined motion of the operating component, the controller outputs the detection result of the motion detector and refrains from outputting the detection result of the touch sensor for a first time period starting from the detection of the predetermined motion of the operating component by the motion detector,
a length of a period during which the controller outputs the detection result of the motion detector and refrains from outputting the detection result of the touch sensor differs between when the contact position of the operating body detected by the touch sensor is the same for the first time period and when the contact position of the operating body detected by the touch sensor is changed for the first time period, when the contact position of the operating body detected by the touch sensor is the same for the first time period, the period during which the controller outputs the detection result of the motion detector and refrains from outputting the detection result of the touch sensor is the first time period plus a second time period starting from the end of the first time period, and when the contact position of the operating body detected by the touch sensor is changed for the first time period, the period during which the controller outputs the detection result of the motion detector and refrains from outputting the detection result of the touch sensor is the first time period, the controller outputs the detection result of the touch sensor in the second time period.

2. The input device according to claim 1, wherein the predetermined motion is rotation of the operating component, and when the motion detector detects that the operating component is rotated by a predetermined angle and the touch sensor detects the contact position of the operating body, the controller outputs the detection result of the motion detector and refrains from outputting the detection result of the touch sensor for the first time period.

3. The input device according to claim 2, wherein the operating component is of a hollow columnar shape and rotatable about a central axis of the operating component, the operating surface is circular in shape and provided on a top surface of the operating component, the motion detector is a sensor that detects the rotation of the operating component, and the touch sensor is a capacitive touch sensor disposed behind a back side of the operating surface.

4. The input device according to claim 3, wherein the operating component is configured to give a click feeling each time the operating component is rotated by a predetermined angle, and the motion detector detects the rotation of the operating component by the predetermined angle each time the operating component gives one click feeling.

5. The input device according to claim 1, wherein the predetermined motion is sliding of the operating component.

6. The input device according to claim 5, wherein the operating component is of a hollow columnar shape and 1s slidable in a cross direction with respect to a placement component on which the operating component is placed, the operating surface is circular in shape and provided on a top surface of the operating component, the motion detector is a sensor that detects the sliding of the operating component, and the touch sensor is a capacitive touch sensor disposed behind a back side of the operating surface.

7. The input device according to claim 1, further comprising:

a display that displays an input made via the operating component and the touch sensor by the operating body; wherein the controller outputs the detection result of the motion detector and the detection result of the touch sensor to the display.

8. The input device according to claim 1, wherein the first time period and the second time period are different times.

* * * * *